(12) United States Patent
Bookbinder et al.

(10) Patent No.: US 8,981,025 B2
(45) Date of Patent: Mar. 17, 2015

(54) POLYMERIZABLE CATONIC PEPTIDE MONOMERS AND POLYMERS

(75) Inventors: Dana Craig Bookbinder, Corning, NY (US); Paul Ernest Gagnon, Jr., Wells, MA (US); Arthur Winston Martin, Horseheads, NY (US); Jodelle Karen Nelson, Painted Post, NY (US); Shawn Michael O'Malley, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 683 days.

(21) Appl. No.: 13/369,689

(22) Filed: Feb. 9, 2012

(65) Prior Publication Data

US 2012/0208972 A1    Aug. 16, 2012

Related U.S. Application Data

(60) Provisional application No. 61/441,573, filed on Feb. 10, 2011.

(51) Int. Cl.
*C08F 222/38* (2006.01)
*C08G 69/10* (2006.01)
(Continued)

(52) U.S. Cl.
CPC ............ *C08F 222/38* (2013.01); *C08G 69/10* (2013.01); *C08F 220/70* (2013.01); *C08F 220/58* (2013.01)
USPC ...................................................... 526/238.1

(58) Field of Classification Search
CPC .... C08F 222/38; C08F 220/58; C08F 220/70; C08G 69/10
See application file for complete search history.

(56) References Cited

U.S. PATENT DOCUMENTS

| 4,979,959 A | 12/1990 | Guire |
| 6,127,448 A | 10/2000 | Domb |

(Continued)

FOREIGN PATENT DOCUMENTS

| WO | 9007545 | 7/1990 |
| WO | 2006114130 | 11/2006 |

(Continued)

OTHER PUBLICATIONS

E. Ciucurel et al. "A Poloxamine-Polylysine Acrylates Scaffold for modular tissue engineering", J. of Biomaterials Science, 2010, pp. 1-14.

(Continued)

*Primary Examiner* — Richard A Huhn
(74) *Attorney, Agent, or Firm* — Susan S. Wilks

(57) ABSTRACT

Disclosed herein are functionalized cationic peptide monomers: peptide chains of two or more positively charged amino acids chosen from lysine or arginine, or derivatives thereof, which are functionalized, meaning that they are bound to one or more polymerization moieties. The functionalized cationic peptide monomers can be described by the formula Z-Xaa$_n$-Z$^1_{n1}$ wherein Z and Z$^1$ are polymerization moieties and n1 is an integer of 0 or 1; Xaa is each independently an amino acid Lys or Arg and n is an integer from 2 to 10 and wherein at least one Xaa amino acid of Xaa is Lys, wherein the carboxyl terminus of the amino acid sequence is amidated. Functionalized cationic peptide monomers can be combined and polymerized to form cell culture surfaces.

20 Claims, 9 Drawing Sheets

(51) Int. Cl.
*C08F 220/70* (2006.01)
*C08F 220/58* (2006.01)

(56) References Cited

U.S. PATENT DOCUMENTS

| | | |
|---|---|---|
| 6,251,433 B1 | 6/2001 | Zuckermann et al. |
| 6,497,729 B1 | 12/2002 | Moussy et al. |
| 7,011,842 B1 | 3/2006 | Simhambhatla et al. |
| 7,070,798 B1 | 7/2006 | Michal et al. |
| 7,553,876 B2 | 6/2009 | Shaker |
| 7,781,203 B2 | 8/2010 | Frutos et al. |
| 7,803,394 B2 | 9/2010 | Hossainy |
| 2002/0090640 A1 | 7/2002 | Kuhara et al. |
| 2005/0164258 A1 | 7/2005 | Goldberg et al. |
| 2005/0169957 A1 | 8/2005 | Hossainy |
| 2006/0002974 A1 | 1/2006 | Pacetti et al. |
| 2006/0062821 A1 | 3/2006 | Simhambhatla et al. |
| 2006/0222677 A1 | 10/2006 | Baroli et al. |
| 2007/0003588 A1 | 1/2007 | Chinn et al. |
| 2007/0166351 A1 | 7/2007 | Hossainy |
| 2007/0286883 A1 | 12/2007 | Lensen et al. |
| 2007/0286885 A1 | 12/2007 | Hossainy et al. |
| 2008/0038310 A1 | 2/2008 | Hossainy et al. |
| 2008/0213463 A1 | 9/2008 | Cook et al. |
| 2009/0110713 A1 | 4/2009 | Lim et al. |
| 2009/0324677 A1 | 12/2009 | Traversa et al. |
| 2010/0048411 A1 | 2/2010 | Przyborski et al. |
| 2010/0143438 A1 | 6/2010 | Todd et al. |

FOREIGN PATENT DOCUMENTS

| | | | |
|---|---|---|---|
| WO | 2008004990 | 1/2008 | |
| WO | 2008062168 | 5/2008 | |
| WO | 2009100645 | 8/2009 | |
| WO | 2010027471 | 3/2010 | |
| WO | WO 2011014594 A1 * | 2/2011 | .............. C08F 36/00 |
| WO | WO 2012109068 A2 * | 8/2012 | .............. C12N 5/00 |

OTHER PUBLICATIONS

D. Hern et al. "Incorporation of adhesion peptides into nonadhesive hydrogels useful for tissue resurfacing", J. of Biomedical Materials Research, 1998, vol. 39, Issue 2, pp. 266-276.

U. Hersel et al., "RGD modified polymers: biomaterials for stimulated cell adhesion and beyond", Biomaterials, 24 (2003), pp. 4385-4415.

Siew Peng Ho et al., "Arg-Gly-Asp Peptides in Polyurethanes: design, synthesis, and characterization", Advanced Materials, 6 (1994), No. 2, pp. 130-132.

Z. Melkoumian et al., "Synthetic peptide-acrylate surfaces for long-term self-renewal and cardiomyocyte differentiation of human embryonic stem cells", Nature Biotechnology, 2010, vol. 28, No. 6, pp. 606-612.

R. Quirk et al. "Poly(L-lysine)-GRGDS as a biomimetic surface modifier for poly(lactic acid)", Biomaterials, 22 (2001), pp. 865-872.

J. Song et al., "Mineralization of synthetic polymer scaffolds: a bottom-up approach for the development of artificial bone", JACS Articles, Published on Web Feb. 17, 2005, pp. 3366-3372.

J. Olsen et al., "Trypsin Cleaves Exclusively C-terminal to arginine and lysine residues", Technology, Molecular and Cellular Proteomics 3.6, 2004, pp. 608-614.

J. Zhu et al., "Design and synthesis of biometric hydrogel scaffolds with controlled organization of cyclic RGD peptides", Bioconjugate Chem., 2009, 20, pp. 333-339.

J. Zhu et al., "Extracellular matrix-like cell-adhesive hydrogels from RGD-containing poly(ethylene glycol) diacrylate", Macromolecules, 2006, vol. 39, No. 4, pp. 1305-1307.

* cited by examiner

POLYMERIZABLE CATONIC PEPTIDE MONOMERS AND POLYMERS

CROSS-REFERENCE TO RELATED APPLICATIONS

This application claims the benefit of priority under 35 U.S.C. §119 of U.S. Provisional Application Ser. No. 61/441,573 filed on Feb. 10, 2011, the content of which is relied upon and incorporated herein by reference in its entirety.

FIELD

The present disclosure relates to polymerizable monomers for forming polymeric cell culture surfaces. More particularly, the disclosure relates to polymerizable monomers having cationic amino acids suitable for forming cationic cell culture surfaces.

BACKGROUND

In the field of cell culture, researchers are seeking cell culture surfaces which improve cell characteristics such as cell growth in culture. Reducing potentially contaminating ingredients such as serum or cell extracts is also desirable. Polymeric surfaces have been used for cell culture. In some cases, these polymeric surfaces have been formed from monomers containing amino acids or peptides. Acrylated or methacrylated amino acids have been used to form cell culture surfaces.

For example, Hern and Hubbell (Diane L. Hern and Jeffrey A. Hubbell; *Incorporation of Adhesion Peptides into Nonadhesive Hydrogels useful for Tissue Resurfacing*; J. Biomed. Mater. Res. 39, 266 (1998)) disclosed the formation of a (meth)acrylated peptide, including an adhesion peptide having an RGD sequence, by functionalizing the amine terminus of the peptide with an acrylate moiety. These functionalized peptides were then copolymerized with polyethylene glycol (PEG) or PEG diacrylate to form hydrogel cell culture surfaces having incorporated cell adhesion sequences.

Successful culture of difficult-to-culture cells requires that cell culture surfaces be tailored to accommodate the particular requirements of these cells. Bone cells, for example, prefer to be cultured in the presence of hydroxyapatite surfaces such as those discussed in Song et al. Song et al (Jie Song, Viengkham Malathong, Carolyn R. Bertozzi, *Mineralization of Synthetic Polymer Scaffolds: A Bottom-Up Approach for the Development of Artificial Bone*, J. Am. Chem. Socl., 2005, 127, 3366-3372) disclosed the use of anionic groups such as methacrylated GLY (GlyMA), SER (SerMA), ASP (SerMA) and GLU (GluMA), and a methacrylated amino acid sequence RGD, a known cell adhesive monomer, to form a polymeric hydrogel containing 2-hydroxyethyl methacrylate (HEMA) or 2-hydroxyethyl dimethacrylamide (HEMAm) and cross-linkers ethylene glycol dimethacrylte (EGDMA) or ethylene glycol dimethacrylamide (EGDMAm). These anionic functionalized hydrogels were then used to provide a substrate for hydroxyapatite mineralization, after exposure of the hydrogel to urea. The negatively charged monomers, along with hydroxyethyl ester side chains of pHEMA that may have been hydrolyzed during the mineralization process, provided $Ca^{2+}$ binding sites and allowed for the formation of a mineralized hydroxyapatite cell culture surface.

Ciucurel and Sefton (Ema C. Ciucurel and Michael V. Sefton; *A Poloxamine-Polylysine Acrylate Scaffold for Modular Tissue Engineering*; J. Biomaterials Science, 2010 DOI: 10.1163/092050610X541133) disclosed the use of acrylated polylysine polymerized with poloxamine to form a poloxamine-polylysine acrylate (PPA) photopolymerized polymer. PPA hydrogels were able to support the proliferation of human microvascular endothelial cells (HMEC-1, a cell line) in culture.

Melkoumian et. al. (Jennifer L. Weber, David M. Weber, Andrei G. Fadeev, Yue Zhou, Paula Dolley-Sonneville, Jiwei Yang, Liqun Qui, Catherine A. Priest, Christopher Shogbon, Arthur W. Martin, Jodelle Nelson, Peter West, James P. Beltzer, Santona Pal and Ralph Brandenberger), *Synthetic peptide-Acrylate Surfaces for Long-Term Self-Renewal and Cardiomyocyte Differentiation of Human Embryonic Stem Cells*, (2010) Nature Biotechnology, Vol. 28, Number 6, 606-610 disclosed peptide-acrylate surface for long-term culture and differentiation of cardiomyocytes derived from human embryonic stem cells.

SUMMARY

In an embodiment (1), a prepolymer composition is provided comprising at least two functionalized cationic peptide monomers of the formula: $Z\text{-Xaa}_n\text{-}Z^1_{n1}$ wherein Z and $Z^1$ are polymerization moieties and n1 is an integer of 0 or 1; Wherein Xaa is each independently an amino acid Lys or Arg and n is an integer from 2 to 10 and wherein at least one Xaa amino acid of Xaa is Lys wherein the carboxyl terminus of the amino acid sequence is amidated. In an embodiment (2), the composition of embodiment (1) is provided, wherein at least one Lys amino acid of $\text{Xaa}_n$ comprises a polymerization moiety at the epsilon nitrogen of the Lys sidechain. In an embodiment (3), the composition of embodiments 1 or 2 is provided wherein the polymerization moiety comprises a photopolymerization moiety or a thermopolymerization moiety. In an embodiment (4), the composition of embodiments 1 or 2 is provided wherein the polymerization moiety comprises an acrylate, methacrylate, acrylamide, methacryalmide, maleimide, epoxide or fumarate group. In an embodiment (5), the composition of embodiments 1 or 2 wherein one of the at least two monomers is $\text{MAA-Lys-Lys-NH}_2$. In an embodiment (6), the composition of embodiments 1 or 2 is provided wherein one of the at least two monomers is $\text{MAA-Lys-Lys(MAA)-NH}_2$. In an embodiment (7), the composition of claim 1 or 2 is provided wherein one of the at least two monomers is $\text{MAA-Arg-Arg-NH}_2$. In an embodiment (8) the composition of claim 1 or 2 is provided wherein one of the at least two monomers is $\text{MAA-Arg-Arg-Lys(MAA)-NH}_2$. In an embodiment, (9) a polymeric material made from the prepolymer composition of any one of embodiments 1-8 is provided. In an embodiment (10) the composition of any one of embodiments 1-8 is provided further comprising 3-methacryoyl lysine. In an embodiment (11), the composition of any one of embodiments 1-8 or 10 is provided further comprising 1-vinyl imidazole. In an embodiment (12) a polymeric material made from the prepolymer composition of embodiments 10 or 11 is provided.

DETAILED DESCRIPTION

Figure 1:
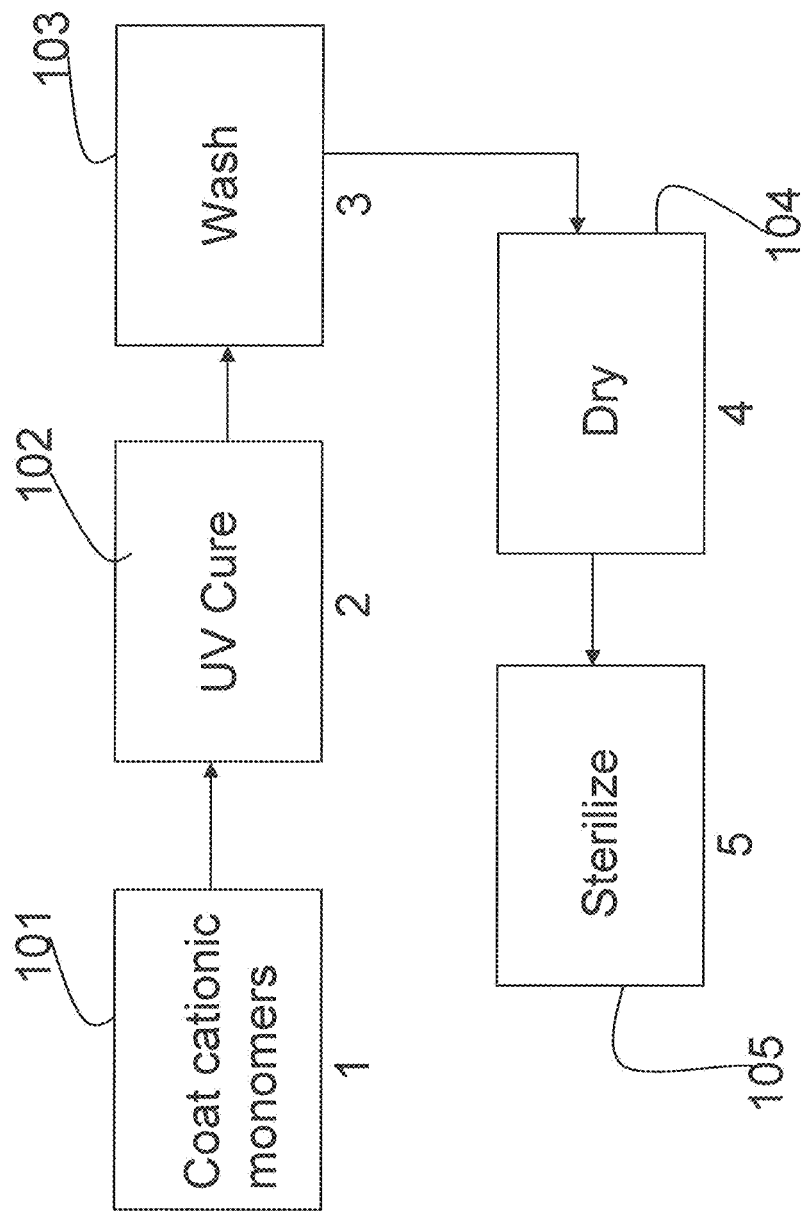
FIG. 1 is a flow chart showing an embodiment of a method of making cell culture surfaces.
Figure 2:
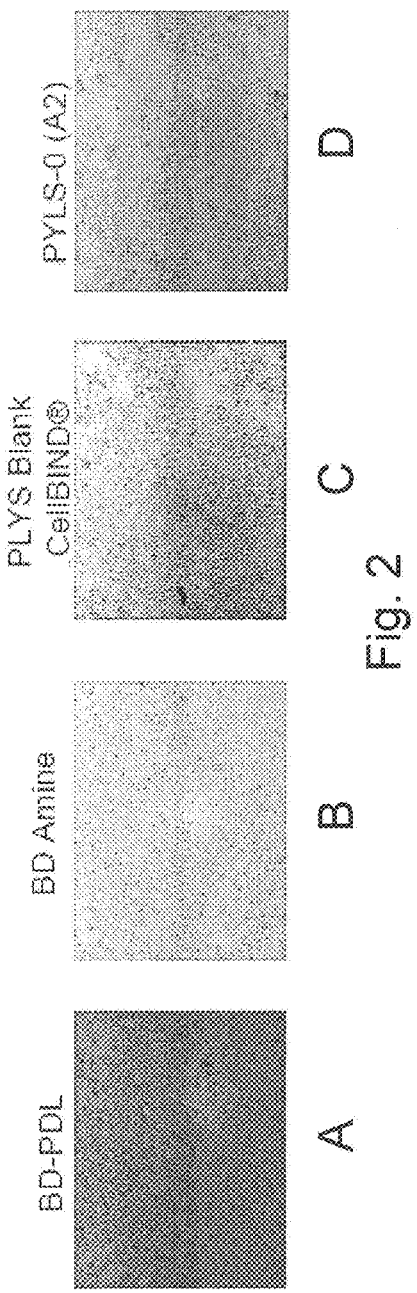
FIG. 2A-D are photographs showing morphology of HEK-293 cells cultured on gamma sterilized surfaces prepared from embodiments of monomers of the present invention (D), compared to (A) poly-D lysine surface available from Becton Dickenson (Franklin Lakes, N.J.); (B) Amine Pure Coat surface from Becton Dickenson® (C) poly-D lysine surface (on a CellBIND® surface) available from Corning®.
Figure 3:
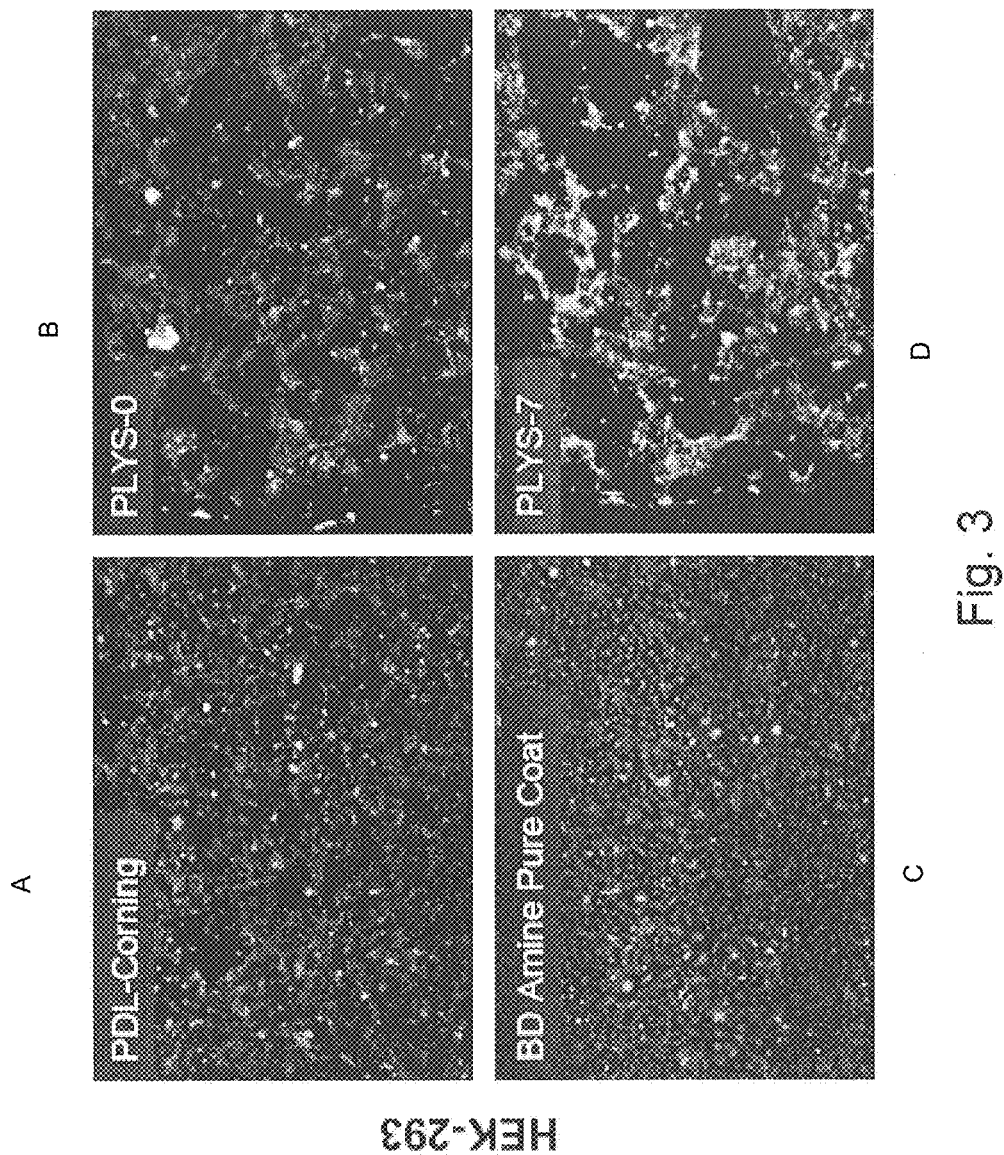
FIG. 3 A-D are photomicrographs showing HEK-293 cells on PLYS-0 (B) and PLYS-7 (D) embodiments of cell culture surfaces prepared from the functionalized cationic peptide monomers disclosed herein, compared to control surfaces Poly-D-Lysine (PDL) (A) from Corning, Corning, N.Y. and Amine Pure Coat from BD Biosciences (C), Franklin Lakes, N.J.

Disclosed herein are functionalized cationic peptide monomers: peptide chains of two or more positively charged amino acids chosen from lysine or arginine, or derivatives thereof, which are functionalized, meaning that they are bound to one or more polymerization moieties The functionalized cationic peptide monomers can be described by the formula $Z\text{-}Xaa_n\text{-}Z^1_{n1}$ wherein Z and $Z^1$ are polymerization moieties and n1 is an integer of 0 or 1; Xaa is each independently an amino acid Lys or Arg and n is an integer from 2 to 10 and wherein at least one Xaa amino acid of Xaa is Lys, wherein the carboxyl terminus of the amino acid sequence is amidated. Functionalized cationic peptide monomers can be combined and polymerized to form cell culture surfaces.

In the following detailed description, reference is made to the accompanying drawings that form a part hereof, and in which are shown by way of illustration several specific embodiments of devices, systems and methods. It is to be understood that other embodiments are contemplated and may be made without departing from the scope or spirit of the present disclosure. The following detailed description, therefore, is not to be taken in a limiting sense. All scientific and technical terms used herein have meanings commonly used in the art unless otherwise specified. The definitions provided herein are to facilitate understanding of certain terms used frequently herein and are not meant to limit the scope of the present disclosure. As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise. As used herein, "have", "having", "include", "including", "comprise", "comprising" or the like are used in their open ended sense, and generally mean "including, but not limited to."

Functionalized cationic peptide monomers for forming cationic polymers, including cell culture surfaces are disclosed herein. For the purposes of this disclosure "functionalized cationic peptide monomer" means a peptide chain of two or more positively charged amino acids chosen from lysine (also referred to as Lys or K) or arginine (also referred to as Arg or R) or Asparagine (or Asn or N) (or derivatives of positively charged amino acids such as Orn (ornithine), which are functionalized, meaning that they are bound to one or more polymerization moieties. In addition, Dpr (2,3-diaminopropionic acid), Hyl (hydroxylysine), Dbu (2,4-diaminobutyric acid) or asparagine (also referred to as Asn or N) may be positively charged amino acids for purposes of this disclosure.

Functionalized cationic peptide monomers can be described by the following formula 1:

$$Z\text{-}Xaa_n\text{-}Z^1_{n1} \qquad \text{Formula 1:}$$

wherein Z and $Z^1$ are polymerization moieties and n1 is an integer of 0 or 1; wherein Xaa is each independently an amino acid Lys or Arg or Asn and n is an integer from 2 to 10 and wherein at least one Xaa amino acid of Xaa is Lys; and wherein the carboxyl terminus of the amino acid sequence is amidated. In embodiments, each Xaa is independently a cationic or positively charged amino acid Lys or Arg or Asn (or derivatives of positively charged amino acids such as ornithine, Dpr (2,3-diaminopropionic acid), Hyl (hydroxylysine), Dbu (2,4-diaminobutyric acid) or asparagine (also referred to as Asn or N). The term "independently" is used herein to indicate that each Xaa may differ from other Xaa amino acids.

A polymerization moiety or polymerizable moiety may be acrylate, methacrylate, acrylamide, methacryalmide, maleimide, fumarate or epoxide group. Functionalized cationic peptide monomers may have one or more than one polymerization moieties. If the cationic peptide monomer has more than one polymerization moiety, the monomer is a cross-linker. In embodiments, the polymerizable moiety may be bound to the carboxyl or amino terminal of the peptide chain. In embodiments, the polymerizable moiety may be bound to a side chain of a Lys amino acid.

Traditionally, cationic coatings for cell culture and other life sciences related applications, including poly-L-lysine (PLL) and poly-D-lysine (PDL), have been synthesized by methods such as solid and solution phase synthesis with techniques such as Merrifield Solid Phase Synthesis. An array of protecting groups such as FMOC, t-BOC and Alloc groups are used, while carbodiimides and triazolols as activating groups have been well published. Synthesis of longer chain peptides by chemical ligation has also been used. However, these methods for synthesizing PLL and PDL surfaces can be expensive. The polymerizable-cationic monomers disclosed herein (photo- or thermal-polymerizable) provide a viable alternative to these methods for making cationic surfaces in-situ as well as polymers for coating cell culture ware because of their ability to polymerize by free radical polymerization, redox or cationic photopolymerization to form long polymer chains.

Strong interactions between cultured cells and cell culture surfaces is often desirable. For example, in cell-based drug discovery screening, scientists often culture transfected and cryopreserved division-arrested cells for use in cell-based screening assays. Strong attachment of these cells is critical to achieving a robust assay, and cell monolayer consistency is directly related to reproducible assay results.

Examples of functionalized cationic peptide monomers are illustrated in Formulas 2-7:

Formula 2: (MAA)-Lys-Lys-NH$_2$

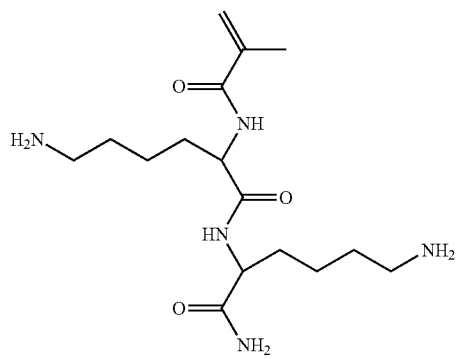

Formula 3: MAA-Lys-Lys(MAA)-NH$_2$

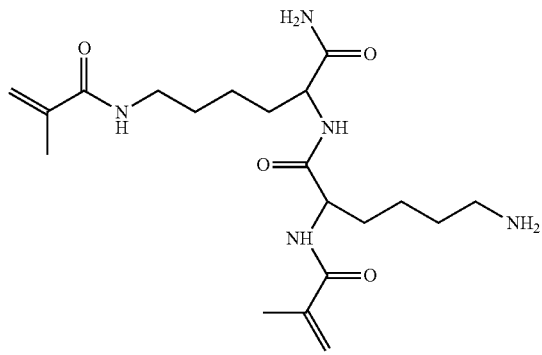

Formula 4: (MAA)-Arg-Arg-Lys(MAA)-NH$_2$

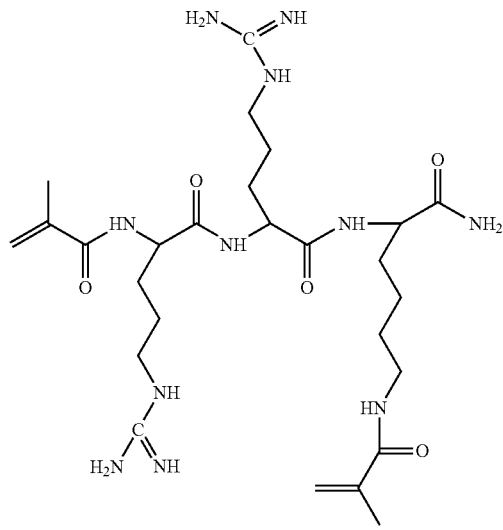

-continued
Formula 5: (MAA-Lys-Lys(MAA)-NH$_2$

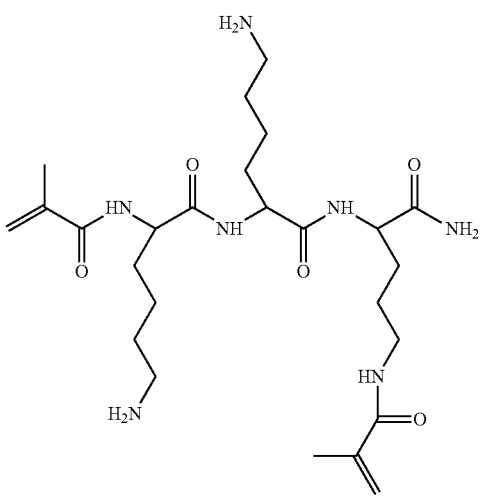

Formula 6: (MAA) Arg-Arg-NH$_2$

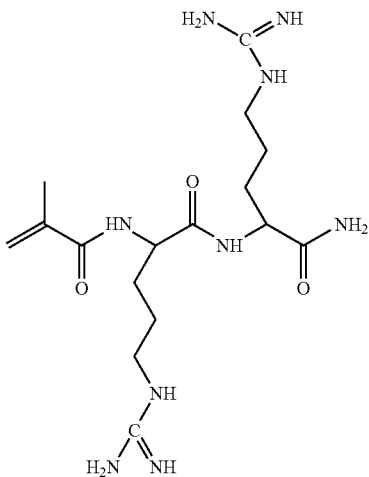

Formula 7: 3-methacryoyl lysine

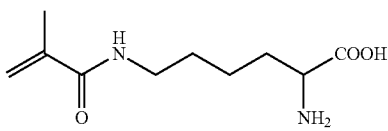

In additional embodiments, functionalized cationic peptide or polypeptide monomers may be described by Formula 1 (Z-Xaa$_n$-Z$^1_{n1}$) where Z and Z$^1$ are polymerization moieties which are, for example, α, β unsaturated ethylenically unsaturated groups which include, for example, acrylate, methacrylate, acrylamide, methacrylamide, maleimide or fumarate groups. Epoxide, methacryoyl or vinyl functional groups may also be polymerizable moieties. One such polymerization moiety (Z) is bound to the carboxyl end of the peptide. In embodiments, a polymerization moiety may be bound to the epsilon amine of the lysine sidechain, as shown in Formulas 4 and 5, for example. In embodiments these polymerization moieties can form polymers upon exposure to an energy source. For example, in embodiments, the polymerization moiety may be polymerizable through exposure to light or temperature change.

The amino acid chain or peptide chain Xaa$_n$ may be any sequence of Lys or Arg or a combination of Lys and Arg, from 2 to 10 amino acids in length. For the purposes of this disclosure, peptide or polypeptide is an amino acid sequence that may be chemically synthesized or made by recombinant methods. However, for the purposes of this disclosure, peptide or polypeptide is not a complete protein.

In embodiments, functionalized cationic peptide monomers can be polymerized to form cell culture surfaces. In embodiments, more than one functionalized cationic peptide monomer described by Formula 1 may be combined and polymerized to form cell culture surfaces. In additional embodiments, more than one functionalized cationic peptide monomer may be combined with additional polymerizable monomers to form cell culture surfaces.

Others have disclosed the use of a long chain PEG spacer, combined with a cell adhesive peptide sequence (an RGD sequence) and a polymerization moiety to provide a cell culture surface. For example Hern, D. L., and Hubbell, J. A., Incorporation of Adhesion Peptides into Nonadhesive Hydrogels Useful for Tissue Resurfacing, Journal of Biomedical Materials Research Part A Vol. 39, Issue 2, pp. 266-276 (Hern & Hubbell) discloses the use of cell adhesive peptides conjugated to a polymerization moiety, and the use of cell adhesive peptides conjugated to polymerization moiety via a long chain polyethylene oxide spacer (PEG75) which was combined with PEG diacrylate (copolymerized with PEG diacrylate) to form a hydrogel cell culture surface composed primarily of PEG.

Poly-D-Lysine coatings and coated cell culture surfaces are commercially available from, for example BioOne Cell Coat® (available from Greiner, Monroe, N.C.), Bio Coat™ (available from BD, Franklin Lakes, N.J.), poly-D-lysine (Thermo Scientific, Rochester, N.Y.), poly-L-lysine (Sciencell™, Carlsbad, Calif.), and Poly-D-Lysine (Millipore, Temecula, Calif.) to name a few. In general, these coatings are made from homo-polymers of poly-lysine synthesized by solution and solid phase synthesis or fermentation. Biological sources of peptides must be purified. Commercially available cationic coatings are generally weakly physically adsorbed to surfaces to form cell culture surfaces. In embodiments of the present invention, a combination of functionalized cationic peptide monomers are provided on a surface, and polymerized in situ. In embodiments, the surfaces are polymerized in situ using UV irradiation in the presence of a photo-initiator. This process results in polymer coatings that are strongly anchored to the surface because they are cured in-situ by free radical photo-polymerization of the cationic functionalized methacrylates to an oxygen rich thermoplastic surface. The polymeric coatings have a modulus that is tunable by varying the concentration of cationic cross-linker present in the formulation. In addition, the degree of positive charge on the surface can also be modulated by changing the concentration of different cationic species. In general, commercial offerings require careful aseptic handling. In contrast, polymeric surfaces made from monomers disclosed herein can be sterilized by any terminal sterilization method including gamma and ethylene oxide at a SAL($10^{-6}$). In addition, in general, commercial offerings for poly-D-lysine coatings are limited to 384, 96 or 6 well plates. Because the polymers of the present invention allow for strong interactions between a substrate and the polymeric coating, these surfaces are applicable in smaller and larger product formats including 1536 well plats, 384, 96, 6 well plates, as well as flasks (T25, T75, T175, T225), roller bottles, HYPERflask™ Cell Culture Vessel, multiple layer cell culture flasks (available from Corning Incorporated, Corning, N.Y.), CellStack® or HYPERStack™ cell culture vessel (available from Corning Incorporated, Corning, N.Y.) beads and microcarriers. In embodiments, the cell culture surface may be formed on any surface suitable for cell culture. Examples of articles suitable for cell culture include single and multi-well plates, such as 6, 12, 96, 384, and 1536 well plates, jars, petri dishes, flasks, beakers, plates, roller bottles, slides, such as chambered and multichambered culture slides, tubes, cover slips, bags, membranes, hollow fibers, cups, spinner bottles, perfusion chambers, bioreactors and fermenters. In addition, embodiments of synthetic coatings prepared from the monomers disclosed herein may allow for extended shelf life and more consistency lot-to-lot and batch-to-batch.

Examples of embodiments of the mixtures of functionalized cationic peptide monomers used to form cell culture surfaces of the present invention are presented in Tables 1-4.

TABLE 1

| Formulation | PLYS-001 | PLYS-011 | PLYS-012 | PLYS-017 | PLYS-001 | PLYS-011 | PLYS-012 | PLYS-017 | PLYS-0 | PLYS-1 | PLYS-2 | PLYS-7 |
|---|---|---|---|---|---|---|---|---|---|---|---|---|
| MAA-Lys-Lys-NH2 (µl) | 80 | 80 | 80 | 40 | 80 | 80 | 80 | 40 | 400 | 400 | 400 | 200 |
| MAA-Lys-Lys-(MAA)-NH2 (µl) | 160 | 80 | 40 | 8 | 160 | 80 | 40 | 8 | 800 | 400 | 200 | 40 |
| 1-Vinyimidazole | 40 | 40 | 80 | 0 | 40 | 40 | 80 | 0 | 200 | 200 | 400 | 0 |
| 3-Methacryloyl-(L)-Lysine (µl) | 40 | 40 | 40 | 0 | 40 | 40 | 40 | 0 | 200 | 200 | 200 | 0 |

TABLE 2

| Formulation | PARG-0 | PARG-1 | PARG-2 | PARG-7 | PARG-001 | PARG-011 | PARG-012 | PARG-017 |
|---|---|---|---|---|---|---|---|---|
| MAA-Arg-Arg-NH2 (µl) | 400 | 400 | 400 | 200 | 80 | 80 | 80 | 40 |
| MAA-Lys-Lys-(MAA)-NH2 (µl) | 800 | 400 | 200 | 40 | 160 | 80 | 40 | 8 |

TABLE 2-continued

| Formulation | PARG-0 | PARG-1 | PARG-2 | PARG-7 | PARG-001 | PARG-011 | PARG-012 | PARG-017 |
|---|---|---|---|---|---|---|---|---|
| 1-Vinylimidazole | 200 | 200 | 400 | 0 | 40 | 40 | 80 | 0 |
| 3-Methacryloyl-(L)-Lysine (μl) | 200 | 200 | 200 | 0 | 40 | 40 | 40 | 0 |

TABLE 3

| | 3-Methacryloyl-(L)-Lysine (μl) | | | | | | | |
|---|---|---|---|---|---|---|---|---|
| | 200 | 200 | 200 | 0 | 40 | 40 | 40 | 0 |
| Formulation | PARG-20 | PARG-21 | PARG-22 | PARG-27 | PARG-30 | PARG-31 | PARG-32 | PARG-37 |
| MAA-Arg-Arg-NH2 (μl) | 400 | 400 | 400 | 200 | 80 | 80 | 80 | 40 |
| MAA-Lys-Lys-(MAA)-NH2 (μl) | 800 | 400 | 200 | 40 | 160 | 80 | 40 | 8 |
| 1-Vinylimidazole | 200 | 200 | 400 | 0 | 40 | 40 | 80 | 0 |

TABLE 4

| Formulation | PASN-0 | PASN-1 | PARN-2 | PARN-7 |
|---|---|---|---|---|
| MAA-Asn-Asn-NH2 (μl) | 400 | 400 | 400 | 200 |
| MAA-Asn-Asn-(MAA)-NH2 (μl) | 800 | 400 | 200 | 40 |
| 1-Vinylimidazole | 200 | 200 | 400 | 0 |
| 3-Methacryloyl-(L)-Lysine (μl) | 200 | 200 | 200 | 0 |

In some embodiments, the formulations shown in Tables 1-4 include 1-vinyl imidazole and methacryoyl lysine. Vinyl imidazole is a cationic five member ring monomer that is used to confer additional positive charge to the surface. Methacryoyl lysine is a zwitterionic monomer that is used to provide compatibility and matching reaction rates to di-lysine and di-arginine methacrylate monomer. Some embodiments do not include these monomers (see, for example, PLYS-017, PLYS-7, PARG-7, PARG-017, PASN-7 and PARN-7). These embodiments, without vinyl imidazole and methacryoyl lysine provided useful cell culture surfaces. However, surfaces prepared without functionalized cationic peptide monomers were not useful cell culture surfaces (data not shown). In embodiments, the formulations shown in Tables 1-4 also include photoinitiators and solvents. For example, in each of the formulations shown in Tables 1-4, 15 μl of Darocur 1173 (10% in Ethanol), 50 μl of Irgacure I-819 (1% in ethanol) and 8.8 μl of ethanol were present in the formulations, to coat a well of a 96 well plate. In embodiments, the methods of making peptide-containing polymeric cell culture surfaces provide (1) coating functionalized cationic peptide monomers, or mixtures thereof on a substrate; (2) curing or polymerizing the monomers to form polymers; (3) washing; (4) drying; and, (5) sterilizing. In embodiments, additional steps may include packaging and/or shipping the cell culture article having a cationic polymeric cell culture surface made from functionalized cationic peptide monomers.

Depending upon the formulation, and the amount of monomer used in the preparation of the cell culture coating, the polymeric coating may exhibit variable thicknesses. For example, PLYS-0 has a thickness of approximately 100 nm, PLYS-1 has a thickness of approximately 80 nm, PLYS-001 has a thickness of approximately between 10-20 nm. PLYS-017 has a thickness of approximately 1-5 nm. PARG-0 has a thickness of approximately 200 nm. PARG-1 has a thickness of approximately 200 nm.

FIG. 1 is a flow chart showing an embodiment of a method of making cell culture surfaces. In embodiments, methods for forming polymeric cationic cell culture surfaces by providing functionalized cationic peptide monomers, to the surface of a substrate and polymerizing the monomers to form a polymeric surface are provided. These methods include steps of (101) applying a containing at least two functionalized cationic peptide monomers to a cell culture substrate; (102) polymerize the monomers and the functionalized peptide by, for example, exposure to UV/VIS energy to cure the monomers; (103) wash; (104) dry; (105) sterilize. Optional additional treatments include applying a top to a topless flask (welding the top to the flask, for example), labeling, packaging and shipping. In step (101) the mixture of functionalized cationic peptide monomer may be provided to the surface of a substrate by any means know in the art including liquid dispensing, spin coating, spray coating, or other methods. In step (102), the curing or polymerizing step may be accomplished by any means known in the art, and depending upon the nature of the polymerizing moiety, and may include the introduction of photoinitiators into the monomer mixture and the exposure of the surface to UV, visible or thermal energy. In step (103) washing may be accomplished by any means known in the art including liquid dispensing and incubating, with or without agitation, where the liquid may be water, a lower alcohol, a lower alcohol diluted in water, or other solvent. In step (104), the drying step may be present or absent, and may be accomplished by the application of a vacuum and/or heat. In step (105), sterilization may occur by exposure to ethanol, for example, gamma irradiation, or other methods.

In embodiments, in step 101, addition to monomers, a composition forming the layer may include one or more additional compounds such as surfactants, wetting agents, photoinitiators, chain transfer agents, thermal initiators, catalysts additional monomers and activators. Any suitable polymerization initiator may be employed. One of skill in the art will readily be able to select a suitable initiator, e.g. a radical initiator or a cationic initiator, suitable for use with the monomers. In various embodiments, UV light is used to generate free radical monomers to initiate chain polymerization. However, visible light initiators and low temperature initiators may be used instead of UV initiators to shield the peptide from exposure to a more harmful or damaging radiation source such as UV radiation.

Any suitable initiator may be used, including thermal initiators, photo-initiators or room temperature initiators. Examples of polymerization initiators include organic peroxides, azo compounds, quinones, nitroso compounds, acyl halides, hydrazones, mercapto compounds, pyrylium compounds, imidazoles, chlorotriazines, benzoin, benzoin alkyl ethers, diketones, phenones, or mixtures thereof. Potassium persulfate may be used as an initiator for room temperature polymerization. Examples of suitable commercially available, ultraviolet-activated and visible light-activated photoinitiators have tradenames such as IRGACURE 651, IRGACURE 184, IRGACURE 369, IRGACURE 819, DAROCUR 4265 and DAROCUR 1173 commercially available from Ciba Specialty Chemicals, Tarrytown, N.Y. and LUCIRIN TPO and LUCIRIN TPO-L commercially available from BASF (Charlotte, N.C.)

Additional initiators may include water soluble azo-initiators that can be used in thermal polymerization including, for example, (VA-044) 2,2'-Azobis[2-(2-imidazolin-2-yl)propane]dihydro chloride; (VA046B) 2,2'-Azobis[2-(2-imidazolin-2-yl)propane]disulfate dehydrate; (VA-50) 2,2'-Azobis (2-methylpropionamidine)dihydro chloride; (VA-057) 2,2'-Azobis[N-(2-carboxyethyl)-2-methylpropionamidine] hydrate; (VA-060) 2,2'-Azobis{2-[1-(2-hydroxyethyl)-2-imidazolin-2-yl]propane}dihydro chloride; (VA-061) 2,2'-Azobis[2-(2-imidazolin-2-yl)propane]; (VA-067) 2,2'-Azobis(1-imino-1-pyrrolidino-2-ethylpropane)dihydro chloride; (VA-080) 2,2'-Azobis{2-methyl-N-[1,1-bis(hydroxymethyl)-2-hydroxyethyl]propionamide or (VA-086) 2,2'-Azobis[2-methyl-N-(2-hydroxyethyl)propionamide].
Oil soluble azo-initiators such as (V-70) 2,2'-Azobis(4-methoxy-2.4-dimethyl valeronitrile); (V-65) 2,2'-Azobis(2.4-dimethyl valeronitrile); (V-601) Dimethyl 2,2'-azobis(2-methylpropionate); (V-59) 2,2'-Azobis(2-methylbutyronitrile; (V-40) 1,1'-Azobis(cyclohexane-1-carbonitrile); (VF-096) 2,2'-Azobis[N-(2-propenyl)-2-methylpropionamide]; (V-30) 1-[(1-cyano-1-methylethyl)azo]formamide; (VAm-110) 2,2'-Azobis(N-butyl-2-methylpropionamide) or (VAm-111) 2,2'-Azobis(N-cyclohexyl-2-methylpropionamide) may also be used in thermal polymerization. These initiators are available from for example, WAKO Chemicals, Richmond Va. In addition, macro-initiators, such as azo-initiators having a PEG backbone may be used in thermal polymerization.

A photosensitizer may also be included in a suitable initiator system. Representative photosensitizers have carbonyl groups or tertiary amino groups or mixtures thereof. Photosensitizers having a carbonyl groups include benzophenone, acetophenone, benzil, benzaldehyde, o-chlorobenzaldehyde, xanthone, thioxanthone, 9,10-anthraquinone, and other aromatic ketones. Photosensitizers having tertiary amines include methyldiethanolamine, ethyldiethanolamine, triethanolamine, phenylmethyl-ethano lamine, and dimethylamino-ethylbenzoate. Commercially available photosensitizers include QUANTICURE ITX, QUANTICURE QTX, QUANTICURE PTX, QUANTICURE EPD from Biddle Sawyer Corp., Crawley, England.

In general, the amount of photosensitizer or photoinitiator system may vary from about 0.01 to 10% by weight.

Examples of cationic initiators include salts of onium cations, such as arylsulfonium salts, as well as organometallic salts such as ion arene systems.

In embodiments, the substrate may be any material suitable for culturing cells, including a ceramic substance, a glass, a plastic, a polymer or co-polymer, any combinations thereof, or a coating of one material on another. The substrate may be flat or shaped. Such substrates include glass materials such as soda-lime glass, pyrex glass, vycor glass, quartz glass; silicon; plastics or polymers, including dendritic polymers, such as poly(vinyl chloride), poly(vinyl alcohol), poly(methyl methacrylate), poly(vinyl acetate-co-maleic anhydride), poly (dimethylsiloxane) monomethacrylate, cyclic olefin polymers, fluorocarbon polymers, polystyrenes, polypropylene, polyethyleneimine; copolymers such as poly(vinyl acetate-co-maleic anhydride), poly(styrene-co-maleic anhydride), poly(ethylene-co-acrylic acid) or derivatives of these or the like. As used herein, "cyclic olefin copolymer" means a polymer formed from more than one monomer species, where at least one of the monomer species is a cyclic olefin monomer and at least one other monomer species is not a cyclic olefin monomer species. In many embodiments, cyclic olefin copolymers are formed from ethylene and norbornene monomers. Cyclic olefin copolymer resins are commercially available with trade name of TOPAS® from Boedeker Plastics, Inc., Japan and Zeonor from Zeon Chemicals, L.P. Lousiville, Ky. In embodiments, the substrate may be treated to enhance retention of the polymer matrix. For example, the substrate may be treated with chemical or plasma treatments which provide negative charge, positive charge, create a more hydrophilic surface, or create functional chemical groups that enhance the adhesion of the polymer matrix to the substrate. For example, such treatments may include hydrophobic or hydrophilic interactions, steric interactions, affinities or Vander Waal forces.

To form the poly lysine or poly arginine synthetic cell culture surface, the monomers are polymerized. Whether polymerized in bulk phase (substantially solvent free) or solvent phase, the monomers are polymerized via an appropriate initiation mechanism. Many such mechanisms are known in the art. For example, temperature may be increased to activate a thermal initiator; photoinitiators may be activated by exposure to appropriate wavelength of light, or the like. According to numerous embodiments, the monomer or monomer mixture is cured using UV light. The curing preferably occurs under inert gas protection, such as nitrogen protection, to prevent oxygen inhibition. Suitable UV light combined with gas protection may increase polymer conversion, insure coating integrity and reduce cytotoxicity.

In embodiments, the layer may be washed with solvent one or more times to remove impurities such as unreacted monomers or low molecular weight polymer species. In various embodiments, the layer is washed with ethanol or an ethanol-water solution, e.g. 70% ethanol, greater than 90% ethanol, greater than 95% ethanol or greater than about 99% ethanol. Washing with a 70% ethanol solvent may not only serve to remove impurities, which may be cytotoxic, but also can serve to sterilize the surface prior to incubation with cells.

Cells were grown on embodiments of the polymeric surface. Cells tested included a human embryonic kidney cell line HEK-293 (ATCC#CRL-1573), a human hepatocellular carcinoma cell line HEP-G2 (ATCC#HB-8065), a mouse neuroblastoma cell line (Neuro-2a (ATCC#CCL-131) and a rat pheochromocytoma (adrenal cell) cell line PC-12 (ATCC#CRL-1721. Cells were grown in the presence of Mediatech IMDM (available from Mediatech, Manassas, Va.) media supplemented with 10% or 2% fetal bovine serum (FBS, available from Mediatech).

Cells may be used for any suitable purpose, including (i) for investigational studies of the cells in culture, (iii) for developing therapeutics including therapeutic cells, (v) for studying gene expression, e.g. by creating cDNA libraries, and (vi) for studying drug interactions with cells and toxicity screening.

Cell viability was assessed during culture on embodiments of the polymeric surface made from embodiments of the functionalized cationic peptide monomers disclosed herein. Results of the cell viability assessment are reported in Table 5. Table 5 reports cell viability when cells were cultured in 10% serum. Similar experiments were performed for cells cultured in the presence of 2% serum (data not shown). An equal sign (=) indicates cell viability assessed to be the same as cells cultured on control surfaces which included Corning's poly-D-lysine surface, BD Purecoat Amine (+) surface, Tissue culture treated plates and CellBIND® treated plates. A plus sign (+) indicates cell viability assessed to be better than control surfaces. Experiments were carried out in a 96 well plate format.

TABLE 5

|  | HEK-293 | NEURO-2A | PC-12 | HEPG2 |
| --- | --- | --- | --- | --- |
| PLYS-1 | + | + | + | = |
| PLYS-2 | + | + | + | = |
| PLYS-001 | + | + | + | = |
| PLYS-017 | = | + | + | = |
| PARG-0 | = | + | + | = |
| PARG-1 | = | = | = | = |

Cell culture articles prepared according to embodiments of the methods of the present invention can be effectively presented to facilitate growth and proliferation of any relevant cell type, including, primary cells, cell lines, tissues and, for example, stem cells, adult stem cells, Embryonic Stem Cells (ESCs), human Embryonic Stem Cells (hESCs) or Inducible Pluripotent cells (IPCs). In embodiments, these cells in culture may be used in therapeutic applications. IPCs according to the invention may also be differentiated from induced primate pluripotent stem (iPS) cells. iPS cells refer to cells, obtained from a juvenile or adult mammal, such as a human, that are genetically modified, e.g., by transfection with one or more appropriate vectors, such that they are reprogrammed to attain the phenotype of a pluripotent stem cell such as an hESC. Phenotypic traits attained by these reprogrammed cells include morphology resembling stem cells isolated from a blastocyst as well as surface antigen expression, gene expression and telomerase activity resembling blastocyst derived embryonic stem cells. iPS cells typically have the ability to differentiate into at least one cell type from each of the primary germ layers: ectoderm, endoderm and mesoderm and thus are suitable for differentiation into a variety of cell types. The iPS cells, like hESC, also form teratomas when injected into immuno-deficient mice, e.g., SCID mice. (Takahashi et al., (2007) Cell 131(5):861; Yu et al., (2007) Science 318:5858).

Advantages of the synthetic polymeric cell culture surfaces prepared using the functionalized cationic peptide monomers disclosed herein include that surfaces promote the binding of weakly adherent cells, the surfaces can be sterilized using gamma sterilization methods, may exhibit extended stability and shelf life, the coatings are transparent, and are compatible with fluorescent and colorimetric assays. In addition, the surfaces are entirely synthetic. In addition, the coatings are prepared from environmentally friendly starting materials.

In an aspect (1), the disclosure provides a prepolymer composition comprising at least two functionalized cationic peptide monomers of the formula: $Z\text{-}Xaa_n\text{-}Z^1{}_{n1}$ wherein Z and $Z^1$ are polymerization moieties and n1 is an integer of 0 or 1; wherein Xaa is each independently an amino acid Lys or Arg and n is an integer from 2 to 10 and wherein at least one Xaa amino acid of Xaa is Lys and wherein the carboxyl terminus of the amino acid sequence is amidated. In an aspect (2), the disclosure provides the composition of aspect 1 wherein at least one Lys amino acid of $Xaa_n$ comprises a polymerization moiety at the epsilon nitrogen of the Lys sidechain. In an aspect (3), the disclosure provides the composition of aspect 1 or 2 wherein the polymerization moiety comprises a photopolymerization moiety or a thermopolymerization moiety. In an aspect (4), the disclosure provides the composition of aspect 1 or 2 wherein the polymerization moiety comprises an acrylate, methacrylate, acrylamide, methacrylamide, maleimide, epoxide or fumarate group. In an aspect (5), the disclosure provides the composition of aspect 1 or 2 wherein one of the at least two monomers is MAA-Lys-Lys-NH$_2$. In an aspect (6), the disclosure provides the composition of aspect 1 or 2 wherein one of the at least two monomers is MAA-Lys-Lys(MAA)-NH$_2$. In an aspect (7), the disclosure provides the composition of aspect 1 or 2 wherein one of the at least two monomers is MAA-Arg-Arg-NH$_2$. In an aspect (8), the disclosure provides the composition of aspect 1 or 2 wherein one of the at least two monomers is MAA-Arg-Arg-Lys(MAA)-NH$_2$. In an aspect (9), the disclosure provides a polymeric material made from the prepolymer composition of any one of aspects 1-8. In an aspect (10), the disclosure provides the composition of any one of aspects 1-8 further comprising 3-methacryoyl lysine. In an aspect (11), the disclosure provides the composition of any one of aspects 1-8 or 10 further comprising 1-vinyl imidazole. In an aspect (12), the disclosure provides a polymeric material made from the composition of aspect 10 or 11. In an aspect (13), the disclosure provides the composition of aspect 1 wherein one of the at least two monomers is MAA-Lys-Lys-NH$_2$. In an aspect (14), the disclosure provides the composition of aspect 1 wherein one of the at least two monomers is MAA-Lys-Lys(MAA)-NH$_2$. In an aspect (15), the disclosure provides the composition of aspect 1 wherein one of the at least two monomers is MAA-Arg-Arg-NH$_2$. In an aspect, the disclosure provides the composition of aspect 1 wherein one of the at least two monomers is MAA-Arg-Arg-Lys(MAA)-NH$_2$. In an aspect (16), the disclosure provides the composition of aspect 1 wherein the monomers are MAA-Lys-Lys-NH$_2$ and MAA-Lys-Lys(MAA)-NH$_2$. In an aspect (17), the disclosure provides the composition of aspect 16 wherein the composition further comprises 1-vinyl imidazole and 3-methacryoyl lysine. In an aspect (18), the disclosure provides the composition of aspect 1 wherein the monomers are MAA-Arg-Arg-NH$_2$ and MAA-Lys-Lys(MAA)-NH$_2$. In an aspect (19), the disclosure provides the composition of aspect 18 wherein the composition further comprises 1-vinyl imidazole and 3-methacryoyl lysine. In an aspect (20), the disclosure provides the composition of aspect 1 wherein the monomers are MAA-Arg-Arg-NH$_2$ and MAA-Lys-Lys(MAA)-NH$_2$. In an aspect (21), the disclosure provides the composition of aspect 20 wherein the composition further comprises 1-vinyl imidazole and 3-methacryoyl lysine. In an aspect (22), the disclosure provides a polymeric material made from the prepolymer composition of aspect 16. In an aspect (23), the disclosure provides a polymeric material made from the prepolymer composition of aspect 17. In an aspect (24), the disclosure provides a polymeric material made from the prepolymer composition of aspect 18. In an aspect (25), the disclosure provides a polymeric material made from the prepolymer composition of aspect 19. In an aspect (26), the disclosure provides a polymeric material made from the prepolymer composition of aspect 20. In an aspect (27), the disclosure provides a polymeric material made from the prepolymer composition of aspect 21.

In the following, non-limiting examples are presented, which describe various embodiments of the articles and methods discussed above.

EXAMPLES

Materials: Photoinitiators Irgacure-819 (Phosphine oxide, phenyl bis(2,4,6-trimethyl benzoyl) and Darocur 1173 (2-hydroxy-2-methyl-1-phenyl-1-propanone) used in the free radical polymerization of the acrylate hydrogel formulations were obtained from Ciba Specialty Chemicals (Newport Delaware) and used without any further purification. Vinylimidazole and 3-Methacryoyl Lysine were purchased from Polyscience Corporation (Niles, Il) and used as received. Ethanol 200 proof was available in house and used as a solvent to prepare formulations.

General Process for the Synthesis of Functionalized Peptides:

Preparation of (MAA)Lys-Lys-$NH_2$: This functionalized cationic peptide monomer was synthesized on 0.5 mmol Rink Amide resin via standard Fmoc chemistry. The side-chain protecting group, Boc, was used for the amino acid Lys. Fmoc N-protected amino acids were purchased from GL Biochem. Methacrylic acid (MAA) and the coupling and cleavage reagents were purchased from Aldrich. Solvents were purchased from Fisher Scientific. The peptide chain was assembled on resin beginning at the C-terminus by repetitive removal of the Fmoc N-protecting group, followed by subsequent coupling of each N-protected amino acid. HBTU and HOBt were used as coupling reagents and NMM was used as base. A 20% solution of piperidine in DMF was used as the de-Fmoc-reagent. After completion of the last coupling, the peptide resin was treated with TFA cleavage cocktail for 3 hours to cleave the peptide from the resin and remove the side-chain protecting groups. The resulting crude peptide was precipitated from cold ether and dried under vacuum. Yield 500 mg, purity>80%. A total of 500 mg of crude peptide was purified by a 2-inch Waters C18 column with TFA buffer (0.1% TFA in water). Resulting fractions with purity of >90% were lyophilized to dryness. A total of 200 mg of final peptide with a purity of 98.0% was obtained. The product was provided by American Peptide and was used without further purification.

Preparation of (MAA)-Arg-Arg-$NH_2$: This peptide was synthesized on 0.5 mmol Rink Amide resin via standard Fmoc chemistry. The side-chain protecting group, Pbf, was used for the amino acid Arg. Fmoc N-protected amino acids were purchased from GL Biochem. Methacrylic acid (MAA) and the reagents for coupling and cleavage were purchased from Aldrich. Solvents were purchased from Fisher Scientific. The peptide chain was assembled on resin, beginning at the C-terminal, by repetitive removal of the Fmoc N-protecting groups followed by subsequent coupling of each N-protected amino acid. HBTU and HOBt were used as coupling reagent and NMM was used as base. A 20% solution of piperidine in DMF was used as the de-Fmoc-reagent. After completion of the last coupling, the peptide resin was treated with TFA cleavage cocktail for 3 hours to cleave the peptide from the resin and remove the side-chain protecting groups. The resulting crude peptide was precipitated from cold ether and dried under vacuum. Yield 800 mg, purity>70%. Approximately 800 mg of crude peptide was purified by a 2-inch C18 column with TFA buffer (0.1% TFA in water) using a linear gradient of 0-30% acetonitrile in 60 minutes. The pooled fractions with purity of >90% were lyophilized to dryness. A total of 279 mg of final peptide with a purity of 95.3% was obtained. The product was provided by American Peptide and was used without further purification.

Preparation of (MAA)-Lys-Lys-Lys(MAA)-$NH_2$: This peptide was synthesized on 1.0 mmol Rink Amide resin via standard Fmoc chemistry. The side-chain protecting groups used for amino acids were Mtt for C-terminal Lys and Boc for all other Lys residues. Fmoc N-protected amino acids were purchased from GL Biochem. Methacrylic acid (MAA) and the reagents for coupling and cleavage were purchased from Aldrich. Solvents were purchased from Fisher Scientific. The peptide chain was assembled on resin beginning at the C-terminus by repetitive removal of the Fmoc N-protecting groups, followed by subsequent coupling of each N-protected amino acid. HBTU and HOBt were used as coupling reagents and NMM was used as base. A 20% solution of piperidine in DMF was used as the de-Fmoc-reagent. After removal of the Fmoc protecting group at the N-terminal Lys, the Mtt side-chain protecting group was removed by 1% TFA in DCM. The MAA was coupled on the amino group of the N-terminal Lys and on the side-chain of the C-terminal Lys. Peptide resin was treated with TFA cleavage cocktail for 3 hours to cleave the peptide from the resin and remove the Boc Lys side-chain protecting groups. The resulting crude peptide was precipitated from cold ether and dried under vacuum. Yield 1300 mg, purity>20%. The product was provided by American Peptide and was used without further purification. Other functionalized cationic peptide monomers were prepared in a similar fashion.

General Procedure for the preparation of functionalized cationic peptide polymer formulations: Into each separate 50 ml scintillation vial 25 mg of MAA-Lys-Lys-NH2 were prepared in 10 ml (7:3 parts ethanol to water), 25 mg of MAA-Lys-Lys(MAA)-NH2 in 25 ml (20:5 parts ethanol to water) and 25 mg of MAA-Arg-Arg-NH2 in 10 ml (7:3 parts ethanol to water). Other functionalized cationic peptide polymers were similarly prepared. A 100 ml solution of ethanol containing 1% I-819 and 10% D-1173 was mixed as a stock solution and used to prepare formulations according to concentrations represented in tables 1-4.

General Procedure for Coating of functionalized cationic peptide polymer formulations in 96 well plates: Ninety-six well plates were removed from packaging and placed in large nitrogen purge box which is continuously being purged with nitrogen gas. The humidity level in the purge box was less than 30% before dispensing formulations. The semi-automated pippettor was used to dispense 5 µL into each well. After the formulation spread and over the well surfaces, the solvent ethanol was removed by in vacuum oven at 25 to 30 in Hg for 5 minutes before curing.

Procedure for UV Curing Functionalized Cationic Peptide Polymer Formulations: A "Xenon Model RC-801 high intensity pulsed Ultraviolet (UV) light curing system" from INPRO Technologies, Inc. was used in curing. The plates were constantly being purged with nitrogen in order to create an inert environment (for the coatings) during curing. The cure time was set (i.e. 60 sec. in this study).

Procedure for culturing cells: HEK-293, Hep-G2 and Neuro-2a were all maintained in culture using IMDM media (Mediatech) supplemented with 10% Fetal Bovine Serum (FBS—Mediatech). PC-12 were maintained in RPMI-1640 Medium (Mediatech) supplemented with 10% heat inactivated Horse serum (HI-HS) and 5% FBS. All lines were maintained on TCT surface (T175 flasks) and grown in humidified incubators set to 37° C. and 5% CO2. Cultures were passaged once 80% confluence was reached. For passaging cells were harvested using Trypsin/EDTA as a dissociation agent.

FIG. 2A-D are photomicrographs showing morphology of HEK-293 cells cultured on gamma sterilized surfaces prepared from embodiments of monomers of the present invention (D), compared to (A) poly-D lysine surface available from Becton Dickenson (Franklin Lakes, N.J.); (B) Amine Pure Coat surface from Becton Dickenson® (C) poly-D lysine surface (on a CellBIND® surface) available from Corning®. FIG. 2A-D illustrates that HEK-293 cells cultured on PLYS-0 (A2) were comparable to cells growing on control surfaces, Poly-D lysine, Amine Pure Coat and CellBIND treated surfaces.

General procedure for assaying cell viability: On the day of the assay, cell cultures were rinsed once with PBS and then harvested using HyQtase (available from Hyclone, Logan Utah), dissociation solution. Once detached, single cells were re-suspended in corresponding growth media and plated on assay plates at a concentration of $1.5 \times 10^4$ cells/well for the first assay and $3.0 \times 10^4$ cells/well for study #2. For Test #3, on the day of the assay, cell cultures were rinsed once with PBS and then harvested using HyQtase (available from Hyclone, Logan Utah), dissociation solution. Once detached, single cells were resuspended in corresponding growth media supplemented with 2% serum (PC-12=2% HI-Hs and 1% BS). Cells were plated on to assay plates at a concentration of $3.0 \times 104$ cells/well. 24 hour after plating, media was gently aspirated from well and replaced with 100 ul/well of calcein-AM fluorescence dye solution (in PBS). Assay plates were then incubated at 37° C. for 1 hr; fluorescent measurements were taken using EnVision fluorescent plate reader to determine cell viability.

FIG. 3A-D are photomicrographs showing HEK-293 cells on PLYS-0 (B) and PLYS-7 (D) embodiments of cell culture surfaces prepared from the functionalized cationic peptide monomers disclosed herein, compared to control surfaces Poly-D-Lysine (PDL) (A) from Corning, Corning, N.Y. and Amine Pure Coat from BD Biosciences (C), Franklin Lakes, N.J. The cells were calcein-AM stained. HEK-293 cells were viable, but showed different morphology on these surfaces from the morphology exhibited on the control surfaces.

Figure 4:
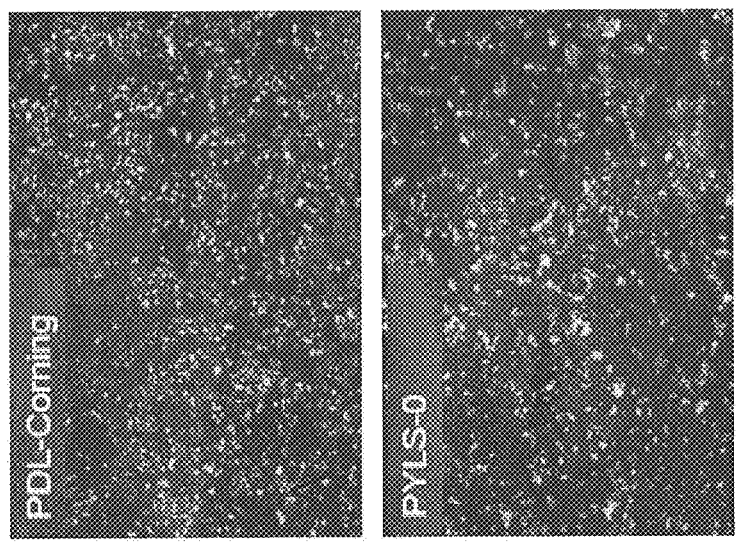
FIGS. 4A and B are photomicrographs showing HEPG2 cells on a control surface poly-D-lysine from Corning® (A) and an embodiment of a polymeric cell culture surface PLYS-0 (B).
Figure 5:
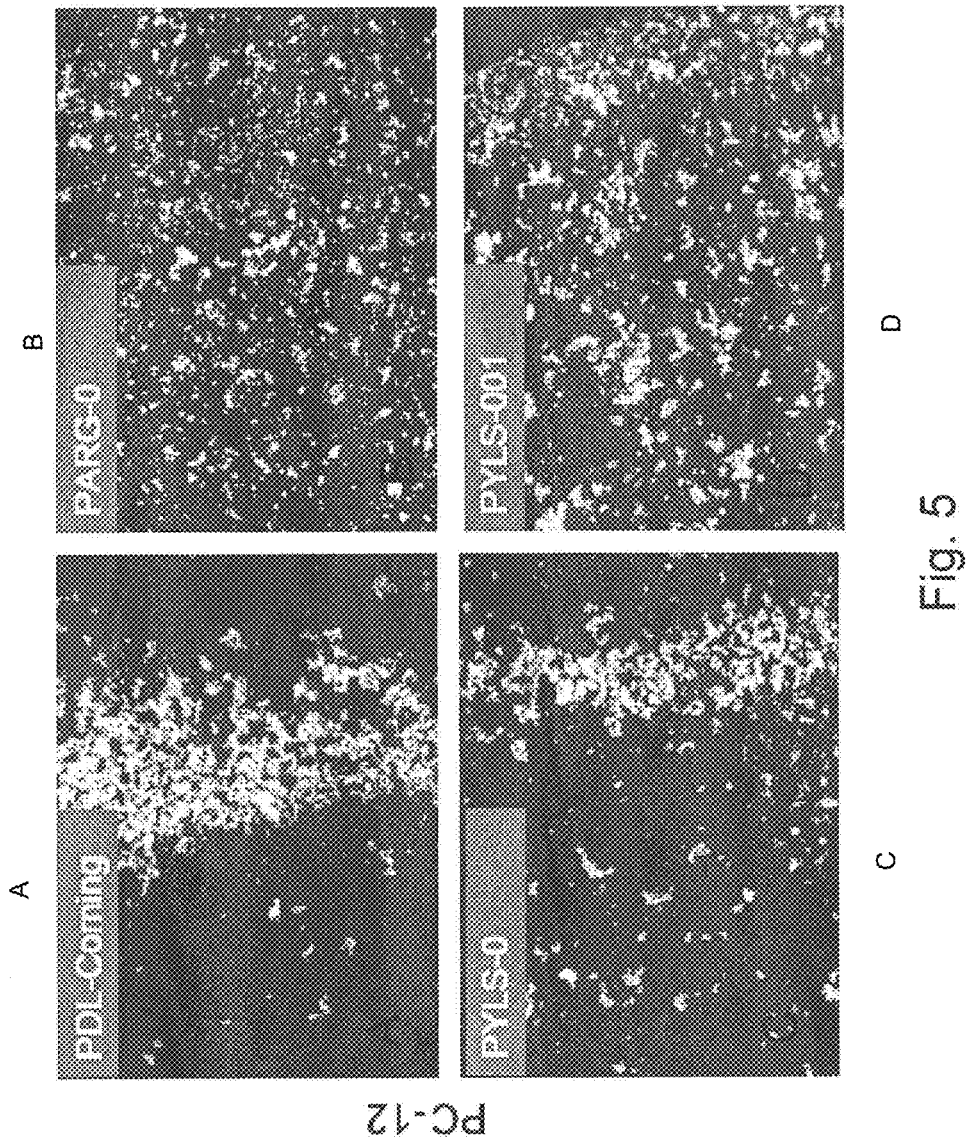
FIG. 5 A-D are photomicrographs showing PC-12 cells on PARG-0 (B), PLYS-0 (C) and PLYS-001 (D) embodiments of cell culture surfaces prepared from the functionalized cationic peptide monomers disclosed herein, compared to control surface Poly-D-Lysine (PDL) (A) from Corning, Corning, N.Y.

FIGS. 4A and B are photomicrographs showing calcein-AM stained HEPG2 cells on a control surface poly-D-lysine from Corning® (A) and an embodiment of a polymeric cell culture surface PLYS-0 (B). The HEPG2 cells showed similar morphology and viability on the inventive surface compared to the control surface.

FIG. 5A-D are photomicrographs showing Calcein-AM stained PC-12 cells on PARG-0 (B), PLYS-0 (C) and PLYS-001 (D) embodiments of cell culture surfaces prepared from the functionalized cationic peptide monomers disclosed herein, compared to control surface Poly-D-Lysine (PDL) (A) from Corning, Corning, N.Y. Calcein-AM staining showed cells on PARG-0, PLYS-001 and PLYS-0 show more uniformity and cell spreading compared to the control surface.

Figures 6A, 6B:
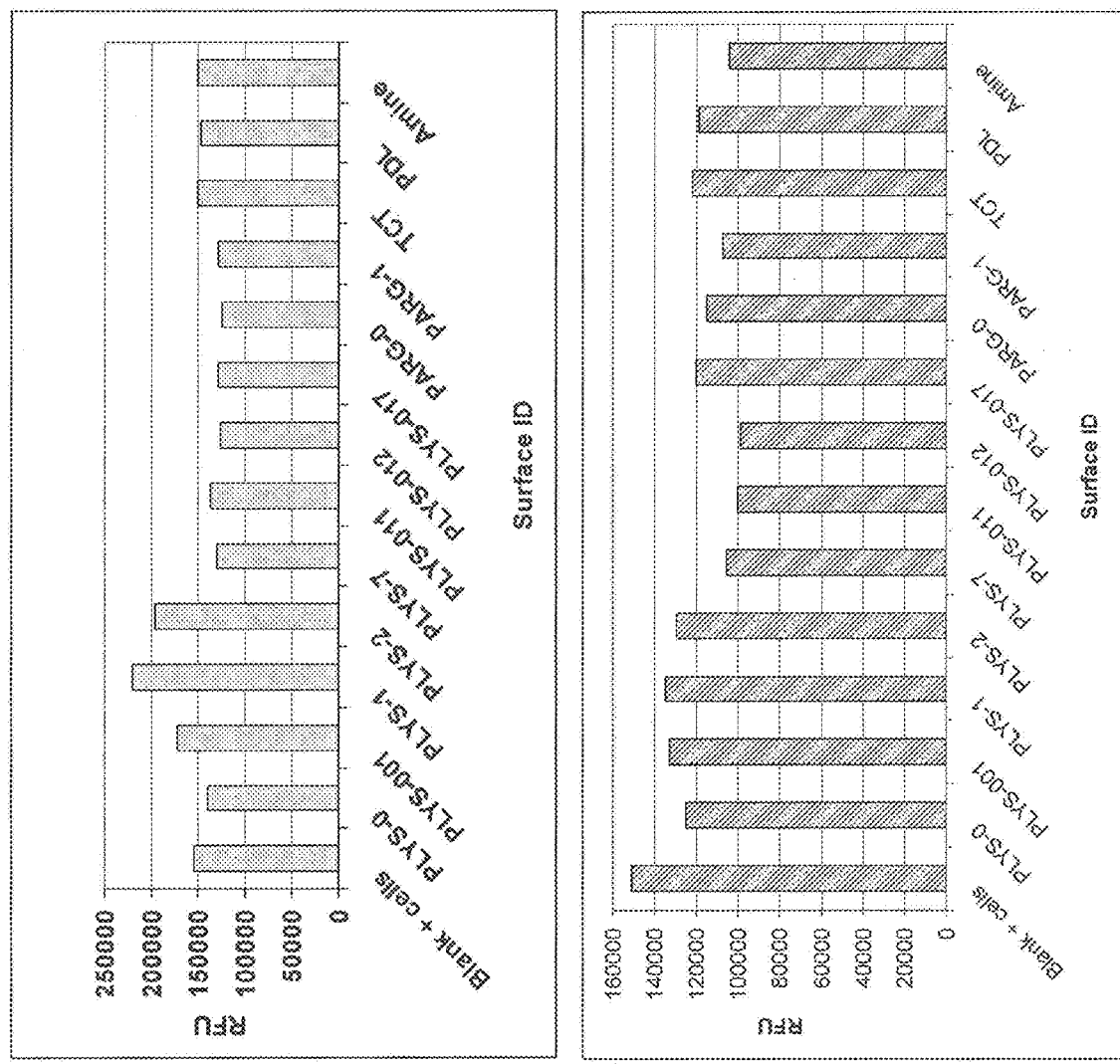
FIGS. 6A and B are graphs showing HEK-293 cell growth (A) and HEP-G2 cell growth (B), measured by RFU, growing in the presence of 10% serum on surfaces prepared from embodiments of the monomers of the present invention.
Figure 7:
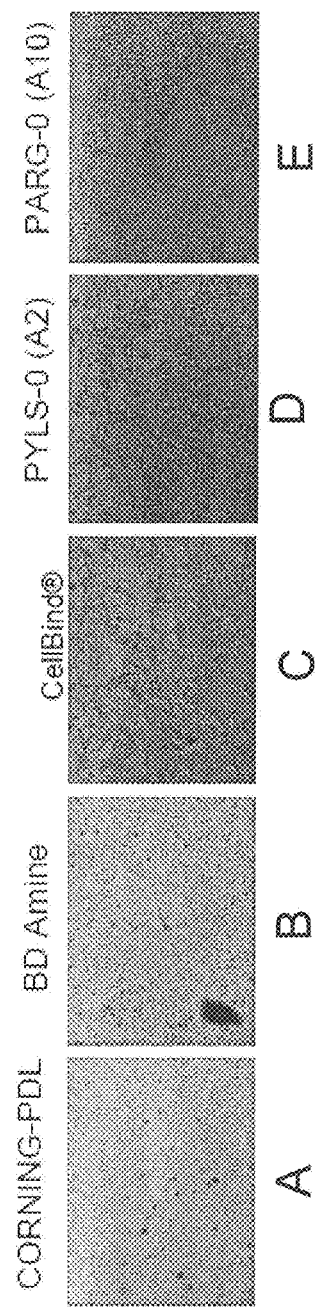
FIG. 7A-E are photographs of showing morphology of HEPG2 cells cultured on gamma sterilized surfaces (D) and (E) prepared from embodiments of monomers of the present invention, compared to (A) poly-D lysine surface available from Corning®; (B) Amine Pure Coat surface from Becton Dickenson® (Franklin Lakes, N.J.); (C) poly-D lysine surface (on a CellBIND® surface) available from Corning®.

FIGS. 6A and B are graphs showing HEK-293 cell growth (A) and HEP-G2 cell growth (B), measured by RFU, growing in the presence of 10% serum on surfaces prepared from embodiments of the monomers of the present invention. HEK-293 cells showed higher cell viability on PLYS-001, PLYS-1 and PLYS-2 surfaces compared to BD Amine Pure Coat and Corning PDL control surfaces.

FIG. 7A-E are photographs of showing morphology of HEPG2 cells cultured on gamma sterilized surfaces (D) and (E) prepared from embodiments of monomers of the present invention, compared to (A) poly-D lysine surface available from Corning®; (B) Amine Pure Coat surface from Becton Dickenson® (Franklin Lakes, N.J.); (C) poly-D lysine surface (on a CellBIND® surface) available from Corning®.

Figures 8A, 8B:
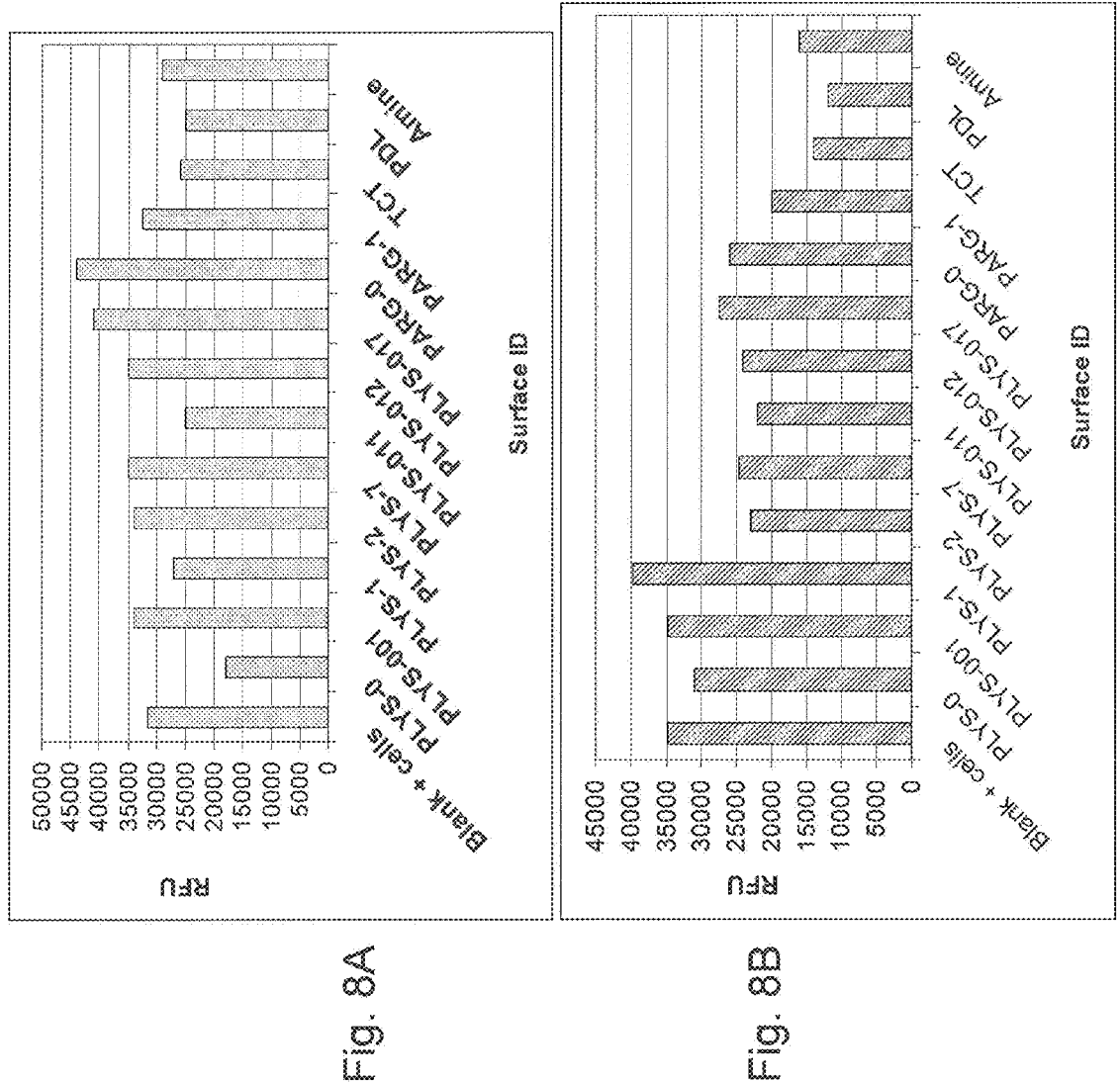
FIGS. 8A and B are graphs showing HEK-293 (A) and HEP-G2 (B) cell growth, measured by RFU, grown in the presence of 2% serum, on surfaces prepared from embodiments of the monomers of the present invention.

FIGS. 8A and B are graphs showing HEK-293 (A) and HEP-G2 (B) cell growth, measured by RFU, grown in the presence of 2% serum, on surfaces prepared from embodiments of the monomers of the present invention. PLYS-001, PLYS-1 and PLYS-2 showed higher cell viability compared to BD Amine Pure Coat and Corning PDL surfaces in these reduced serum conditions.

General procedure for measuring zeta potential: Coatings were measured using an Anton Paar EKA (Electro Kinetic Analyzer). Testing conditions were prepared using 1 mM KCl prepared from 18M MΩ $H_2O$ titrated to approximately pH 10 using 0.01KOH in 0.25pH unit steps and approximately pH 2 using 0.01M HCl in approximately 0.25 pH unit steps. The polymeric coatings and laminin control surface were prepared on glass slides while the PDL and BioCoat surfaces were purchased from BD Biosciences (Franklin Lakes, N.J.) and a portion was cut out and zeta potential measured.

Figure 9:
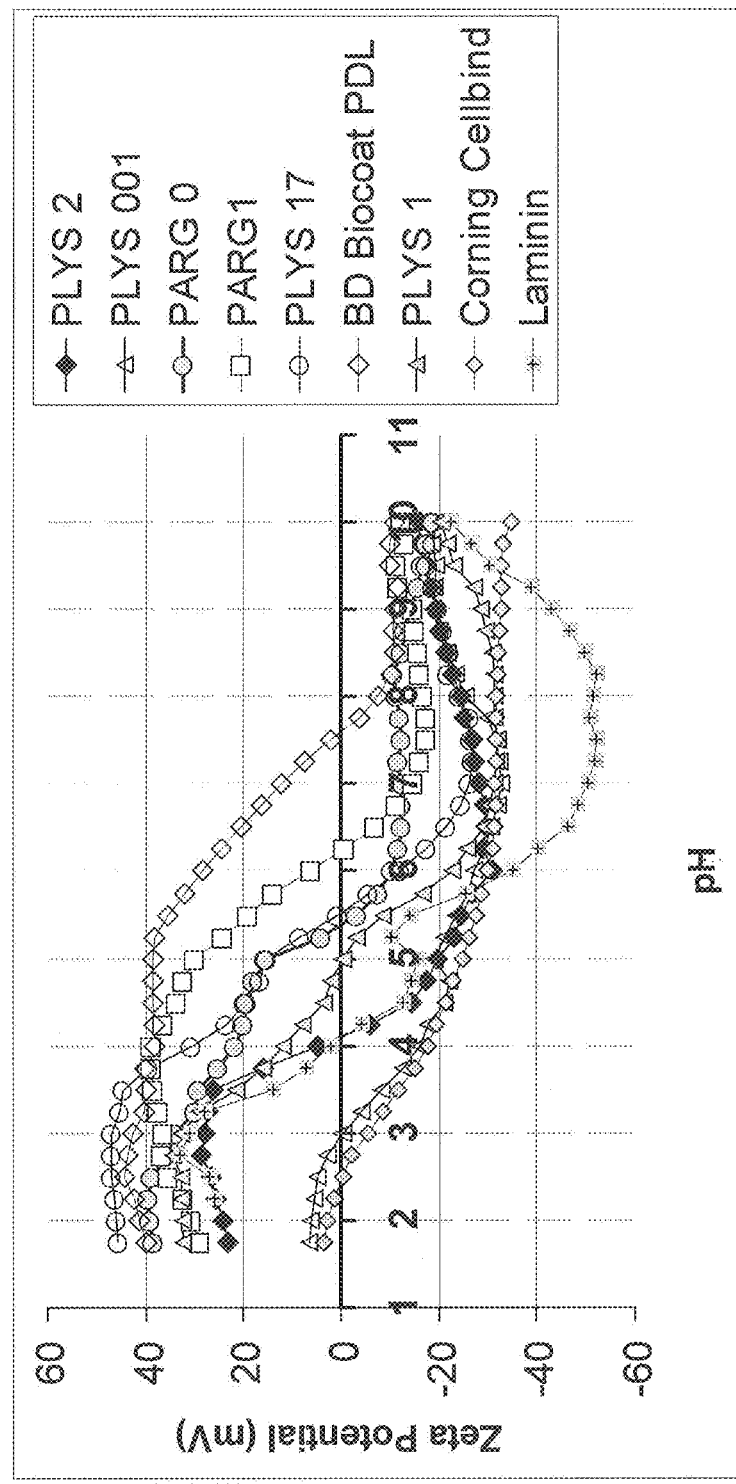
FIG. 9 is a graph showing the zeta potential of several embodiments of polymeric cell culture coatings prepared from functionalized cationic peptide monomers disclosed herein, as a function of pH.

FIG. 9 is a graph showing the zeta potential of several embodiments of polymeric cell culture coatings prepared from functionalized cationic peptide monomers disclosed herein, as a function of pH. Note that these surfaces are tunable to exceed the zeta potential positive values at pH 7.

Thus, embodiments of POLYMERIZABLE CATIONIC PEPTIDE MONOMERS AND POLYMERS are disclosed. One skilled in the art will appreciate that the arrays, compositions, kits articles and methods described herein can be practiced with embodiments other than those disclosed. The disclosed embodiments are presented for purposes of illustration and not limitation.

What is claimed is:

1. A prepolymer composition comprising at least two functionalized cationic peptide monomers of the formula:

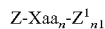

wherein Z and $Z^1$ are polymerization moieties, n1 is an integer of 0 or 1, each Xaa is independently an amino acid Lys or Arg, n is an integer of from 2 to 10, at least one Xaa is Lys, and the moiety $Xaa_n$ is terminated by an amidated carboxyl group.

2. The composition of claim 1 wherein at least one Lys amino acid of $Xaa_n$ comprises a polymerization moiety at the epsilon nitrogen of the Lys sidechain.

3. The composition of claim 1 wherein the polymerization moiety comprises a photopolymerization moiety or a thermopolymerization moiety.

4. The composition of claim 2 wherein the polymerization moiety comprises a photopolymerization moiety or a thermopolymerization moiety.

5. The composition of claim 1 wherein the polymerization moiety comprises an acrylate, methacrylate, acrylamide, methacryalmide, maleimide, epoxide or fumarate group.

6. The composition of claim 2 wherein the polymerization moiety comprises an acrylate, methacrylate, acrylamide, methacryalmide, maleimide, epoxide or fumarate group.

7. The composition of claim 1 wherein one of the at least two monomers is MAA-Lys-Lys-$NH_2$.

8. The composition of claim 1 wherein one of the at least two monomers is MAA-Lys-Lys(MAA)-$NH_2$.

9. The composition of claim 1 wherein the composition further comprises the monomer MAA-Arg-Arg-$NH_2$.

10. The composition of claim 1 wherein one of the at least two monomers is MAA-Arg-Arg-Lys(MAA)-$NH_2$.

11. The composition of claim 1 wherein the monomers are MAA-Lys-Lys-$NH_2$ and MAA-Lys-Lys(MAA)-$NH_2$.

12. The composition of claim 11 wherein the composition further comprises 1-vinyl imidazole and 3-methacryoyl lysine.

13. The composition of claim 1 wherein the composition comprises the monomers MAA-Arg-Arg-NH$_2$ and MAA-Lys-Lys(MAA)-NH$_2$.

14. The composition of claim 13 wherein the composition further comprises 1-vinyl imidazole and 3-methacryoyl lysine.

15. The composition of claim 14 wherein the composition comprises the monomers MAA-Arg-Arg-NH$_2$ and MAA-Lys-Lys(MAA)-NH$_2$.

16. The composition of claim 14 wherein the composition further comprises 1-vinyl imidazole and 3-methacryoyl lysine.

17. A polymeric material made from the prepolymer composition of claim 11.

18. A polymeric material made from the prepolymer composition of claim 12.

19. A polymeric material made from the prepolymer composition of claim 14.

20. A polymeric material made from the prepolymer composition of claim 16.

\* \* \* \* \*